United States Patent [19]

Marchetti

[11] 4,112,271
[45] Sep. 5, 1978

[54] COUNTER DEVICE ASSOCIATED WITH SWITCH ACTUATOR OF ELECTRICAL SHAVER TO DETERMINE BATTERY RECHARGING AND USE

[75] Inventor: Michael John Marchetti, Bridgeport, Conn.

[73] Assignee: Sperry Rand Corporation, Bridgeport, Conn.

[21] Appl. No.: 752,491

[22] Filed: Dec. 20, 1976

[51] Int. Cl.² ............ H01H 35/00; B26B 19/02
[52] U.S. Cl. ............ 200/52 R; 30/DIG. 1; 30/43.92; 200/308
[58] Field of Search ............ 200/52 R, 157, 308, 200/156; 30/DIG. 1, DIG. 2, 34 R, 34 A, 43.92, 45

[56] References Cited

U.S. PATENT DOCUMENTS

| 3,171,006 | 2/1965 | Mulch et al. ............ 200/308 |
| 3,176,106 | 3/1965 | Van Der Driest ............ 200/308 X |
| 3,328,542 | 6/1967 | Andrews ............ 200/52 R |
| 3,550,280 | 12/1970 | Palm ............ 200/157 X |
| 3,803,372 | 4/1974 | Dijkstra ............ 200/52 R |

FOREIGN PATENT DOCUMENTS 1,085,792  7/1960  Fed. Rep. of Germany ......... 30/34 R

OTHER PUBLICATIONS

Norelco, Inc.; Norelco Tripleheaders; "Rechargeable Tripleheader 45CT," 2 pp.

Primary Examiner—James R. Scott
Attorney, Agent, or Firm—Charles R. Miranda

[57] ABSTRACT

A counting device for a battery operated appliance for visually displaying on a counter dial the number of uses of the appliance between recharging or replacement of the batteries. The counter dial is mounted within the appliance with an indicia portion visible at the outer surface of the casing. Movement of the dial is controlled by operation of the on/off switch for the appliance and a reset wheel is included for restoring the counter dial to an "0" or starting position.

12 Claims, 6 Drawing Figures

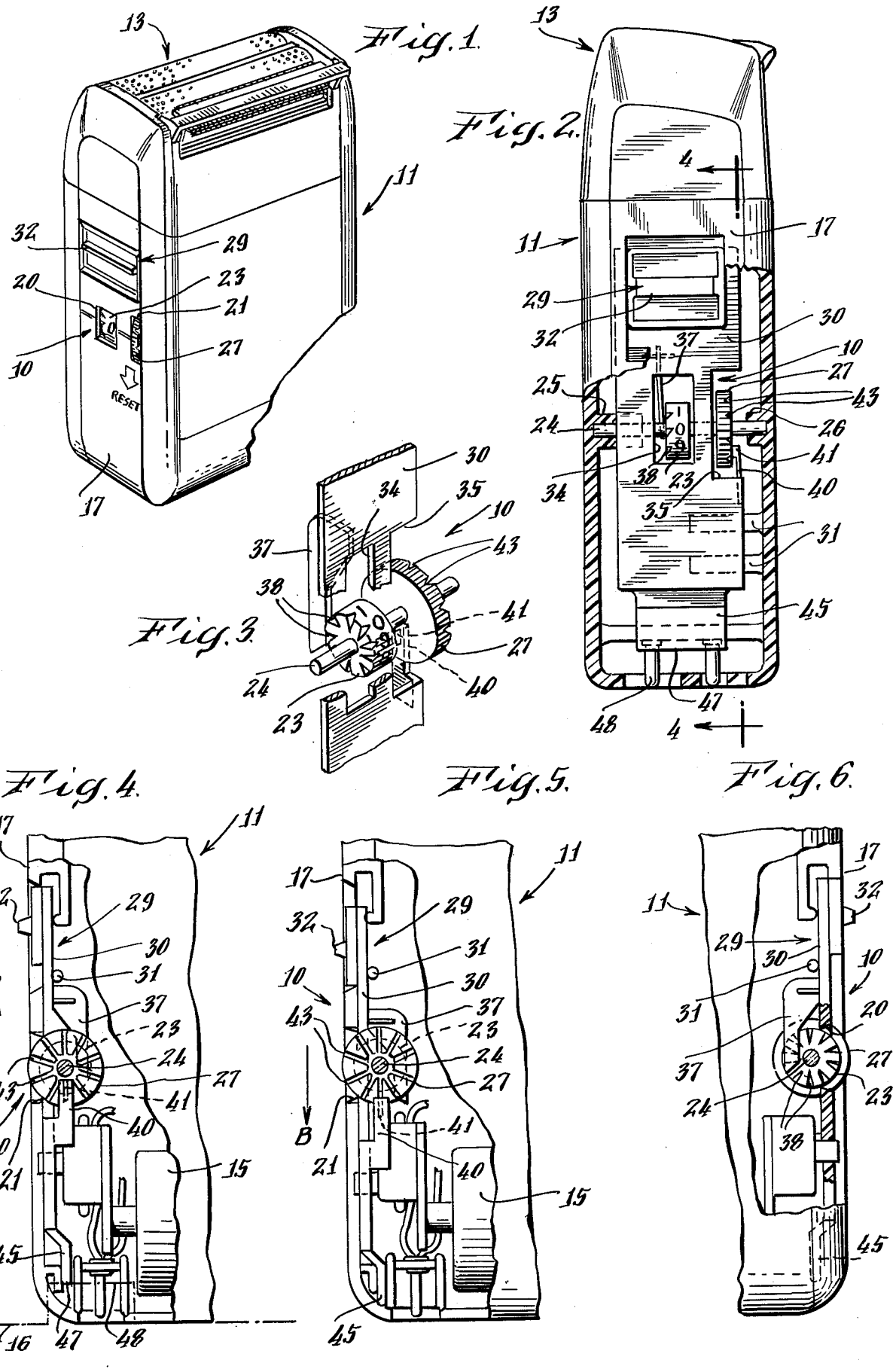

COUNTER DEVICE ASSOCIATED WITH SWITCH ACTUATOR OF ELECTRICAL SHAVER TO DETERMINE BATTERY RECHARGING AND USE

BACKGROUND OF THE INVENTION

This invention is directed to new and useful improvements in counting devices used with portable electric appliances and in particular to counting devices used with electric dry shavers.

Electric dry shavers usually include a cutter head assembly having movable and stationary cutter means, drive means for the movable cutter and a motor for operating the drive means to effect operation of the movable cutter relative to the stationary cutter. In certain shavers the source of power for supplying electrical energy to the motor comprise self-contained batteries which are either rechargeable or are disposable after the charge is depleted. These latter type shavers have proven quite successful and allow for use of the shaver without the need of a power cord connection to an electric supply outlet.

Since these battery operated shavers have periods of use measured by the available power or energy supply of the batteries which when depleted must be either recharged or disposed of and replaced before the shaver can be used again, it is desirable that means be provided whereby the user can judge in advance when the batteries will require service. One method is to utilize a counter within the shaver casing whereby the user after each shaving use can advance the counter incrementaly to record the total number of prior uses. The number of uses required prior to recharging of the batteries will vary with each user. After a short period of ownership of the shaver, however, the owner will usually be able to know how many shaving operations he will obtain from the batteries.

Counting devices for appliances for the purpose of recording the number of uses of an appliance are well-known. These prior counting devices usually include a dial mounted to rotate past an opening in the appliance casing. Numbers from "0" upwards are inscribed on the dial and are moved incrementally from the "0" position in the opening to a preselected highest numerical position as the dial is rotated between uses. The counter dial is held in each sequentially moved position by appropriate detent means. Ratchet arms or the like are employed to advance the dial either manually or automatically as desired. Although these known counting devices have proven acceptable for the purposes employed, various problems are encountered in mounting these mechanisms within a compact appliance casing, such as a shaver casing, due to the relatively complex forming of the parts involved. In addition it is desirable to provide readily operable means for resetting the counter dial to a "0" position from an intermediate setting without the use of tools or other implements when the user desires to start counting anew.

SUMMARY OF THE INVENTION

It is an object of the present invention to provide a novel counter for an electrical appliance.

Another object is to provide a novel counter for use in a battery operated appliance such as an electric dry shaver wherein novel support and actuating means are provided for the counter.

Another object is to provide a novel counter comprised of a minimum number of parts which operates automatically after each use of the appliance.

Still another object is to provide a novel counter having self-contained means for resetting the counter to a "0" position from an intermediate numerical position as desired.

The present invention contemplates a novel counter for an electrical appliance and in particular a battery operated appliance. The counter is mounted on an inner wall of the casing and is actuated by movement of an on/off switch actuator for the appliance. The counter includes a unitary member having an indicia dial, a reset wheel and a common shaft portion within the casing. A ratchet arm is provided on the switch actuator for rotating the dial incrementaly upon each movement of the switch actuator to the "off" position. Numbers from "0" to a preselected highest number are inscribed on the dial and are sequentially rotated past an opening in the casing. Detent means are provided for engaging the reset wheel. In the "off" position of the actuator the detent means prevent accidental movement of the dial and also when the actuator is moved to the "on" position. Means are also provided to rotate the dial when the switch actuator is moved to the "on" position. The reset wheel can reset the dial to an "0" position if desired in either the "on" or "off" positions of the actuator.

The above and other objects and advantages of the present invention will appear more fully hereinafter from a consideration of the detailed description which follows taken together with the accompanying drawing wherein one embodiment is illustrated.

BRIEF DESCRIPTION OF THE DRAWING

In the Drawing:

FIG. 1 is a perspective view of a battery operated shaver having mounted therein a counter constructed according to the present invention;

FIG. 2 is a side elevational view of the shaver of FIG. 1 with parts of the casing broken away to show portions of the interior thereof;

FIG. 3 is a fragmentary perspective view of the counter removed from the shaver casing;

FIG. 4 is a sectional view taken on the line 4—4 and shows the switch actuator in the "off" position;

FIG. 5 is a view similar to FIG. 4 with the switch actuator is moved to the "on" position; and FIG. 6 is a view similar to FIG. 5 showing opposite side of the counter.

DESCRIPTION OF THE PREFERRED EMBODIMENT

Referring now to the drawing for a more detailed description of the present invention, a novel counter made according thereto is generally indicated by the reference numeral 10 in FIGS. 1 to 6. As illustrated in FIG. 1, counter 10 is mounted within an electric dry shaver which is generally indicated by the reference numeral 11. Shaver 11 is of the type having a self-contained internal battery supply 15 (partially shown in FIGS. 4 and 5). Although batteries 15 may be of the type that are disposable after use, they are illustrated as being of the rechargeable type whereby the power supply may be replenished after a period of use as desired by placing shaver 11 on a recharger stand 16 partially shown in FIG. 4) in a well-known manner. As mentioned it is a feature of the present invention to provide a counter 10 of novel construction for automatically indicating to a user the number of total prior uses made of the shaver 11 between times for charging batteries 15 and displaying the number by visual indicia at the outer surface of the casing. To this end a sidewall 17 of shaver 11 is provided with spaced openings 20 and 21. Counter 10 includes a unitary member 22 having a circular indicator or counter dial 23. Numbers from "0" to "9" (for example) are inscribed on the periphery of dial 23 so that such numbers may be incrementaly displayed in opening 20 after each use of shaver 11 to maintain a running total count of the prior uses.

Unitary member 22 includes a shaft 24 having opposite ends rotatably mounted in spaced trunnion 25-26 formed on the opposite inner faces of shaver 11 and a circular reset wheel 27 adjacent dial 23 having a knurled peripheral outer surface exposed in opening 21 on sidewall 17.

Actuating means for automatically rotating dial 23 to incrementaly move dial 23 a predetermined distance to change sequentially the number appearing in opening 20 to the next highest number on dial 23 are incorporated into the operation of an on/off switch actuator 29 for shaver 11.

To this end actuator 29 includes an elongated slide 30 held in slidable position within shaver 11 against sidewall 17 by spaced retaining ribs 31 formed on the inner casing walls. The movement of slide 30 in the direction of arrows "A" and "B" in FIGS. 4 and 5 by manipulation of actuator extension 32 operates switch contacts (not shown) to control the electrical circuit between batteries 15 and the shaver motor in a usual manner. In the upper position of slide 30 (FIG. 4) the shaver 11 is in an "Off" or a charging condition and in the down position (FIG. 5) of slide 30 the shaver is "On" and in an operative condition.

Slide 30 is provided with a central opening 34 in which is located dial 23. Reset wheel 27 is located in an adjacent cut-out portion 35 of slide 30. Both opening 34 and cut-out 35 are enlarged to permit movement of slide 30 in the directions of arrows A and B without interference with the rotation of dial 23 or reset wheel 27.

Means to rotate dial 23 include a ratchet arm 37 extending from slide 30 at opening 34 for successive engagement in notches 38 formed in and about the peripheral edge of dial 23. Notches 38 are equal in number to the number of indicia inscribed on dial 23. When actuator 29 is moved to the "Off" position (FIG. 4) ratchet arm 37 will automatically rotate dial 23 clockwise one position by engaging the walls of a notch 38 thereby moving the next highest number on dial 23 to a display position in opening 20.

Detent means are provided to hold dial 23 in the moved position and which means include a detent arm 40 having a detenting end portion 41 adapted to successively detent in grooves 43 in the surface of reset wheel 27 as dial 23 is rotated. Grooves 43 also coincide in number to the number of indicia on dial 23 and to the number of notches 38 on counter dial 17. End portion 41 is moved successively to the next groove 43 as slide 30 is moved to the "Off" position and dial 23 is rotated in position by ratchet arm 37.

Manual rotation of reset wheel 27 clockwise at opening 21 in shaver 11 deflects end portion 41 outwardly of groove 43 for restoration of dial 23 to a "0" display position from an intermediate position.

Another feature of this invention is that slide 30 is provided with an extension 45 so that when shaver 11 is placed on charging stand 16 the plug surface 48 will engage extension 45 at abutment 47 and move slide 30 in the direction of arrow A to the "Off" position to insure that shaver 11 will not operate during the recharging cycle.

It will be apparent from the foregoing description that the novel counter 10 has many advantages in use. One advantage among others is that counter 10 is comprised of relatively few parts and is mounted within shaver 11 without interfering with the adjacent mechanisms. Further counter 10 can be readily operated either manually through reset wheel 27 or automatically through operation of on/off switch actuator 29 without use of special tools or the like.

It is understood that the present invention is not limited to the embodiment illustrated and described. Various changes can be made in the design and arrangement of parts without departing from the spirit and scope of the invention as the same will now be understood by those skilled in the art.

What is claimed is:

1. A counter for visually indicating to the user the number of prior uses of a battery operated appliance including a casing having a display opening formed therein, a switch within the casing for establishing an electrical circuit between batteries and appliance output means, said counter comprising;
   a. an elongated slide member provided with a dial opening and slidably disposed against an inner surface of the casing for sliding movement between spaced limit positions for selectively operating the switch and including actuator means operable from outside the casing to effect said sliding movement,
   b. an indicia dial attached to a shaft having opposite ends thereof rotatably mounted in trunnions formed on inner walls of the casing, said dial having a portion thereof disposed in the dial opening of the slide member and having numerals inscribed serially on the periphery of said portion of the dial,
   c. ratchet means formed on said slide member and said dial operable upon movement of the slide member to a first of said spaced limit positions for rotating said dial a predetermined distance to expose the next highest numeral on the dial in the display opening in the casing,
   d. reset means mounted on said shaft for rotation therewith and operable from outside the casing through a second opening formed in the casing for resetting the dial to an initial start position, and
   e. detent means formed on said slide member and said reset means operable for detenting and holding said dial in said first limit position of the slide member upon rotation of the dial.

2. The counter of claim 1 wherein said reset means are spaced from the dial and have a portion thereof extending through a second opening in the casing spaced from said display opening for operating said reset means from outside the casing.

3. The counter of claim 2 wherein said reset means include a reset wheel, said detent means engaging with said reset wheel in the first moved position of said slide member.

4. The counter of claim 3 wherein said detent means is deflected clear of the reset wheel to permit free movement of the reset wheel upon rotation of the reset wheel from outside the casing to reset the counter dial.

5. The counter of claim 1 wherein the ratchet means include a ratchet arm carried by the slide member for successively engaging with notches formed in the dial to incrementaly rotate the dial upon movement of the slide member to the first limit position.

6. The counter of claim 5 wherein a reset wheel is mounted on the shaft adjacent the counter dial and is operable from outside the casing to reset the dial to a start or intermediate position.

7. The counter of claim 6 wherein the detent means for holding the counter dial in a first moved position of the slide member include a detent arm on the slide member for successive engagement with grooves provided in the reset wheel, said detent arm being deflected clear of said grooves upon rotation of the reset wheel.

8. The counter of claim 7 wherein said grooves in the reset wheel correspond in number to the notches in the counter dial and wherein the detent arm engages incrementaly in the grooves as the dial is rotated by the ratchet arm.

9. The counter of claim 8 wherein said dial and reset wheel have peripheral portions exposed in adjacent openings formed in the casing.

10. A counter for a battery operated electric dry shaver having a casing in which is arranged a motor, a motor operated cutter head means, and a switch for selectively establishing an electrical circuit between the motor and battery, said counter comprising, a. an elongated slide member provided with a dial opening and slidably mounted on an inner sidewall of the shaver casing for movement between spaced limit positions by operation of an actuator member exposed in an opening in said sidewall to control operation of said switch from outside the shaver casing, b. a dial attached to a shaft having opposite ends thereof rotatably mounted in trunnions formed within said casing, said dial having a portion thereof disposed in the dial opening of the slide member and having its peripheral surface adapted to rotate past a display opening in said sidewall, said dial having numerals serially inscribed on said peripheral surface for incremental display in said display opening, c. ratchet means formed on said slide member and said dial operable upon movement of said slide member to a first of said limit positions by said actuator member for rotation of said dial a predetermined distance to effect incremental display of said numerals in said display opening to visually display the total number of movements of said slide member, d. said slide member operable to a second of said limit positions without effective movement of said dial, e. reset means mounted on said shaft for rotation therewith and operable from outside the shaver casing through a second opening formed in said sidewall for moving said dial to a desired numerical position, and f. detent means formed on said slide member and said reset means operable for detenting and holding said dial in said desired numerical position.

11. The counter of claim 10 wherein said reset means includes a reset wheel mounted on said shaft with said dial and having a portion exposed in said second opening in said casing sidewall adjacent said dial to permit manual rotation thereof from outside said casing.

12. The counter of claim 10 wherein said shaver contains rechargeable batteries and wherein the slide member includes means adapted to engage portions of recharger means to move the slide member to said first limit position during recharging operation.

* * * * *